Nov. 3, 1953     C. A. LOVELL     2,658,189
SIGNALING SYSTEM BASED ON ORTHOGONAL FUNCTIONS
Filed Jan. 9, 1948     10 Sheets-Sheet 1
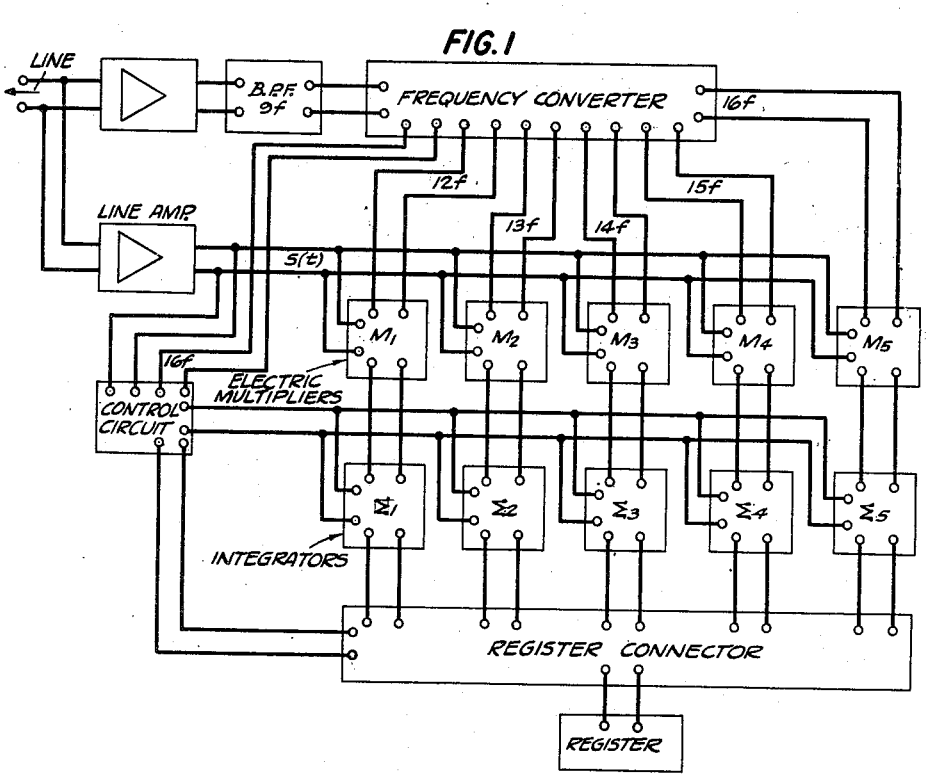
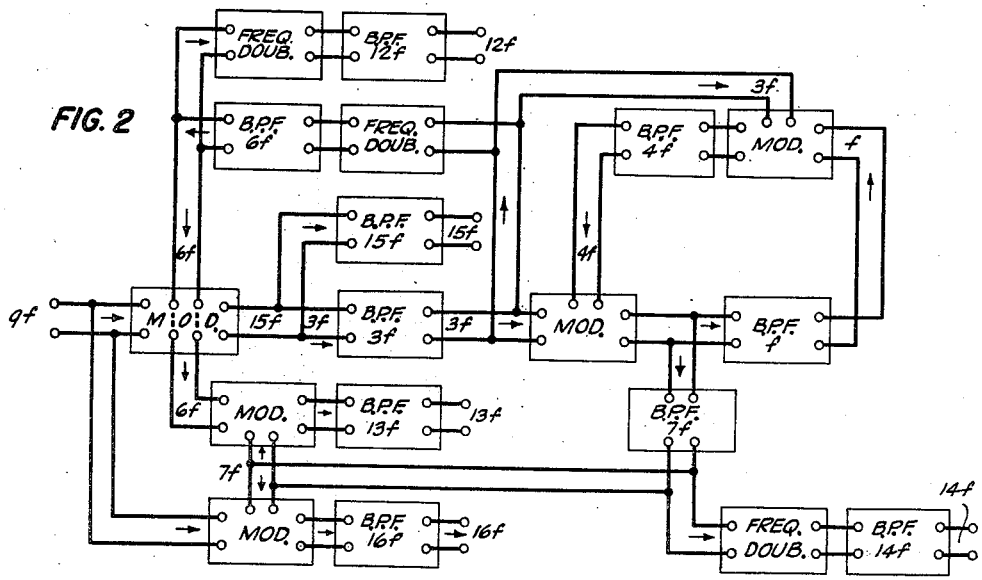
INVENTOR
C. A. LOVELL
BY John E. Cassidy
ATTORNEY

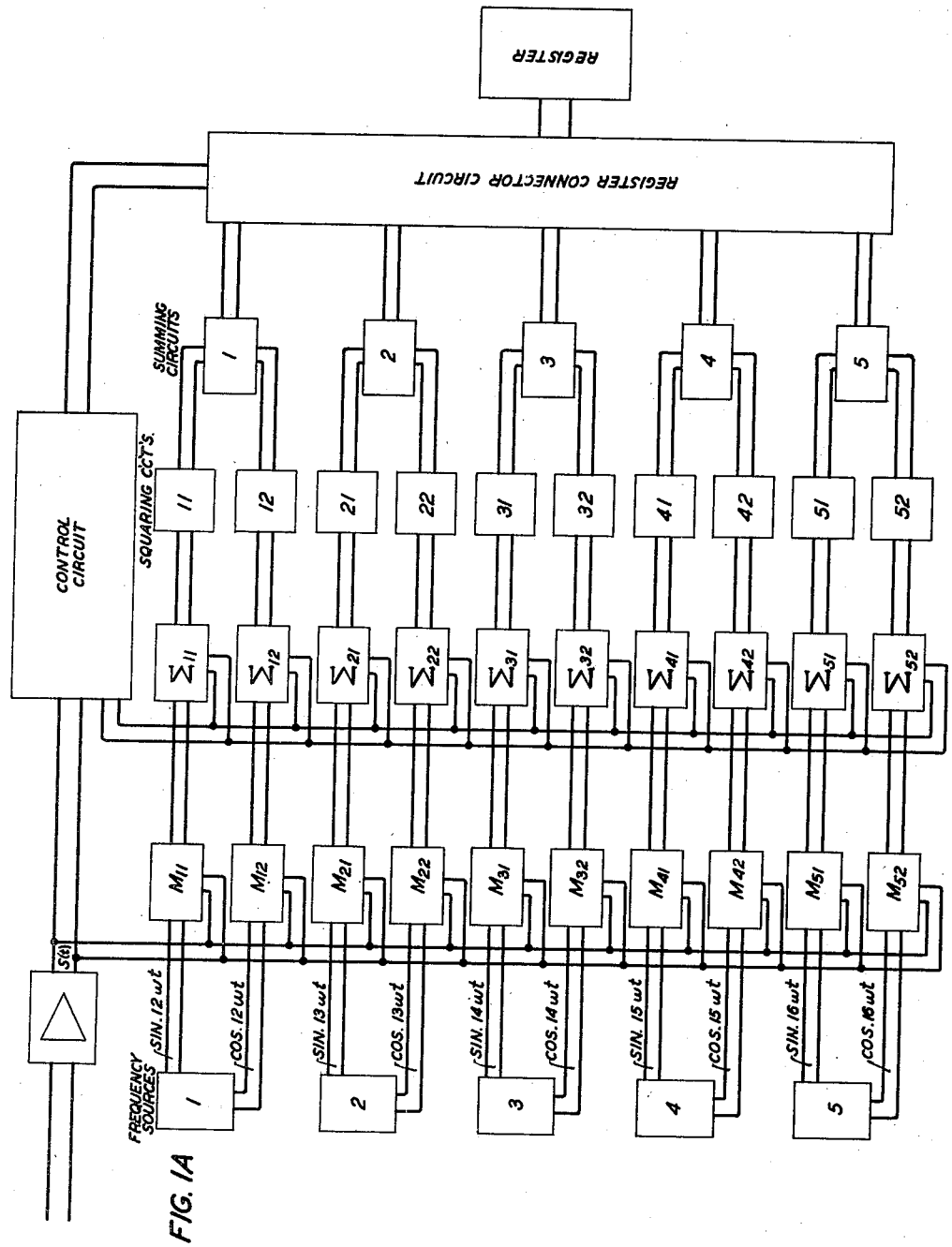

Nov. 3, 1953
C. A. LOVELL
2,658,189
SIGNALING SYSTEM BASED ON ORTHOGONAL FUNCTIONS
Filed Jan. 9, 1948
10 Sheets—Sheet 3
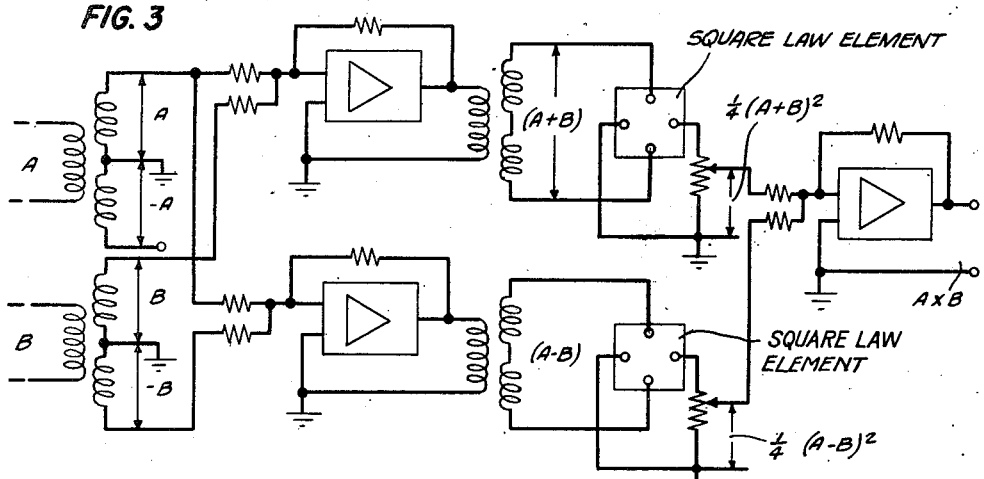
FIG. 3
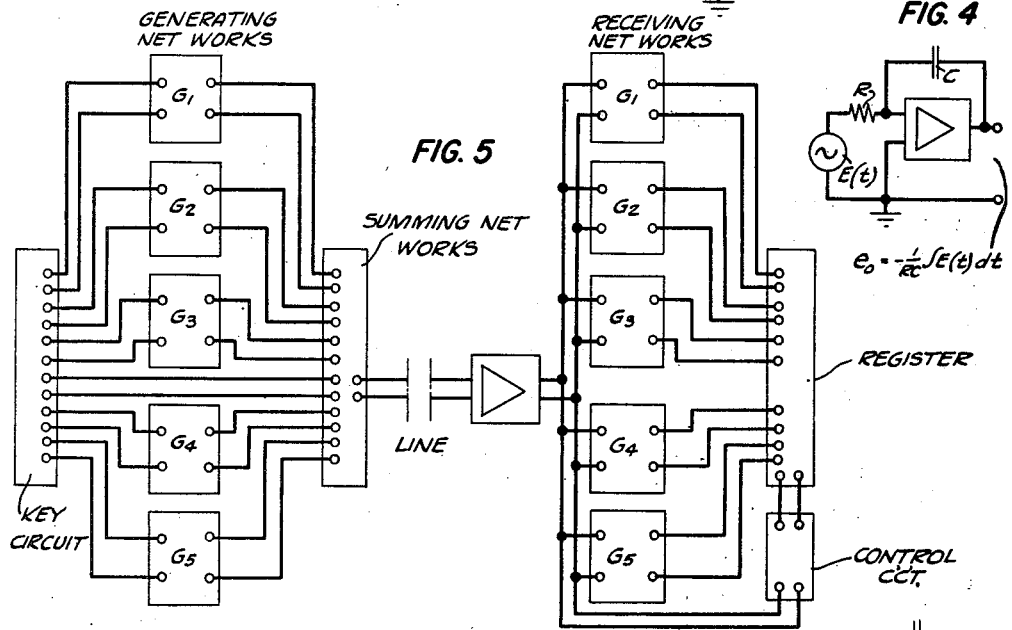
FIG. 5
FIG. 4
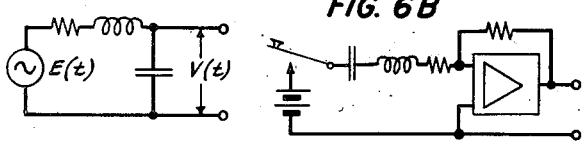
FIG. 6A  FIG. 6B
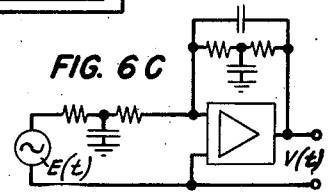
FIG. 6C
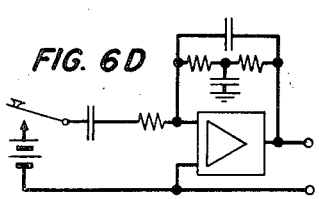
FIG. 6D
INVENTOR
C.A. LOVELL
BY
John E. Cassidy
ATTORNEY Nov. 3, 1953  C. A. LOVELL  2,658,189
SIGNALING SYSTEM BASED ON ORTHOGONAL FUNCTIONS
Filed Jan. 9, 1948    10 Sheets-Sheet 4
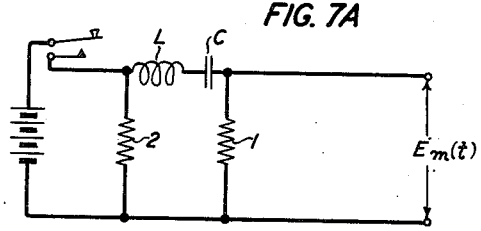
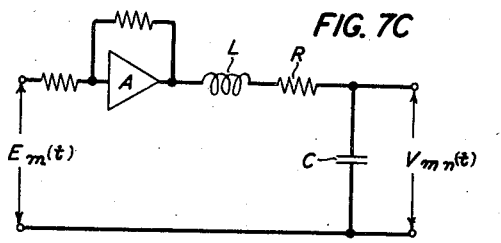
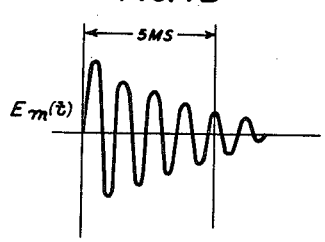
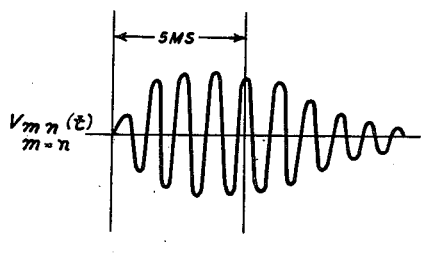
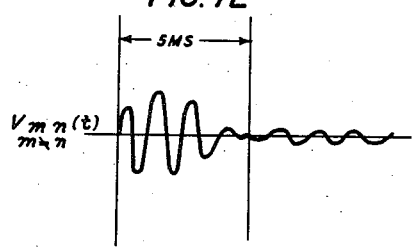
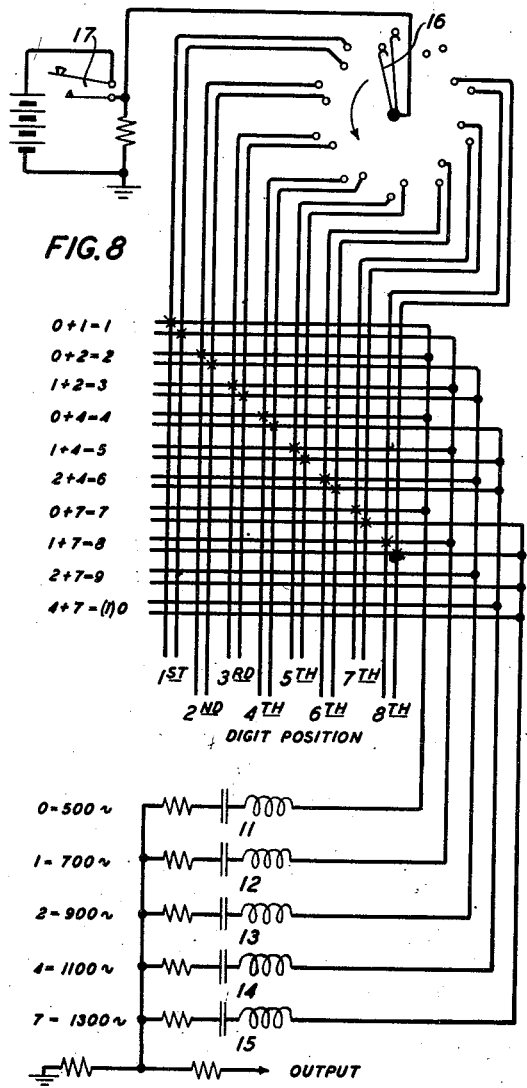
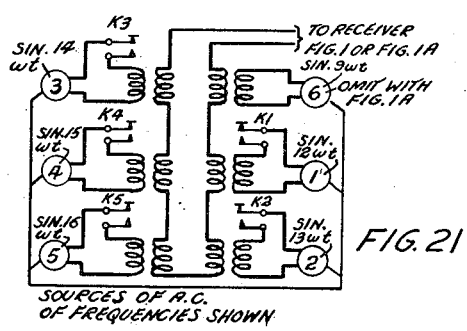
INVENTOR
C. A. LOVELL
BY John E. Cassidy
ATTORNEY Nov. 3, 1953 C. A. LOVELL 2,658,189
SIGNALING SYSTEM BASED ON ORTHOGONAL FUNCTIONS
Filed Jan. 9, 1948 10 Sheets-Sheet 5
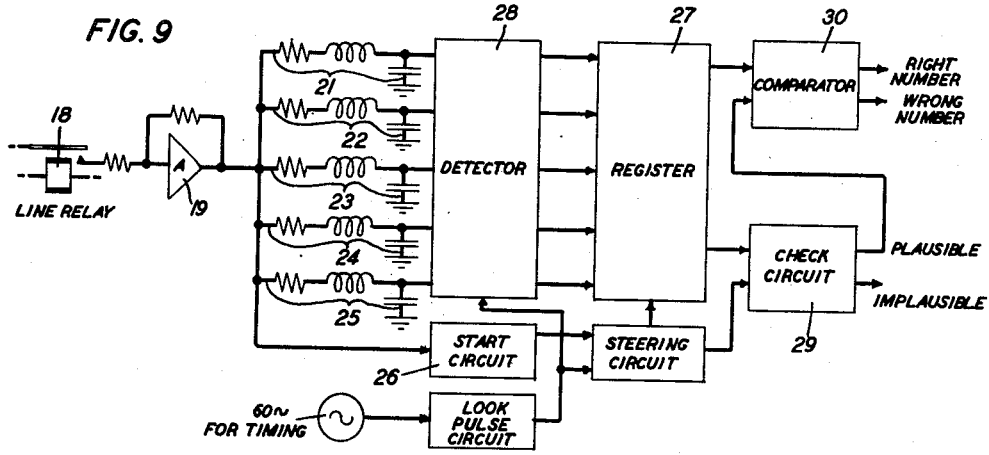
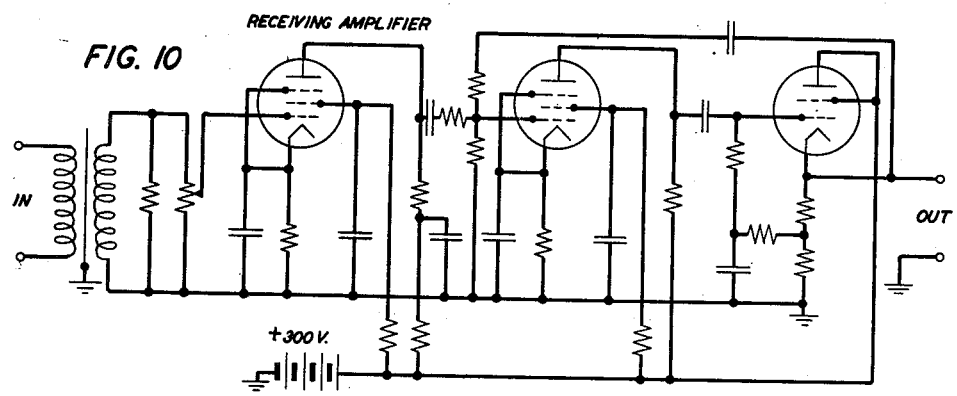
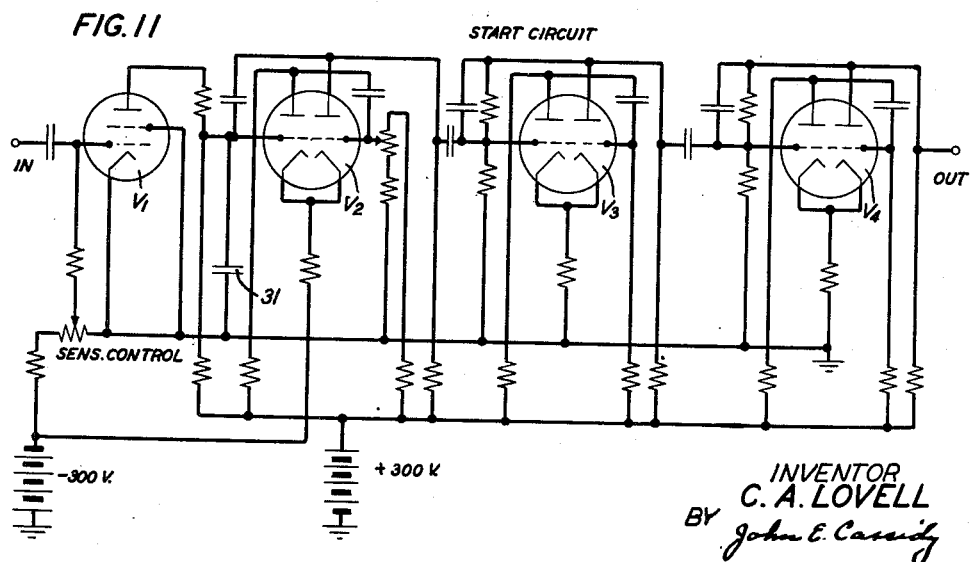
INVENTOR
C. A. LOVELL
BY John E. Cassidy
ATTORNEY Nov. 3, 1953 — C. A. LOVELL — 2,658,189
SIGNALING SYSTEM BASED ON ORTHOGONAL FUNCTIONS
Filed Jan. 9, 1948 — 10 Sheets-Sheet 6
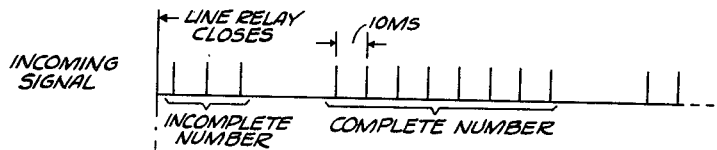
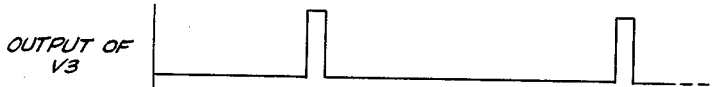
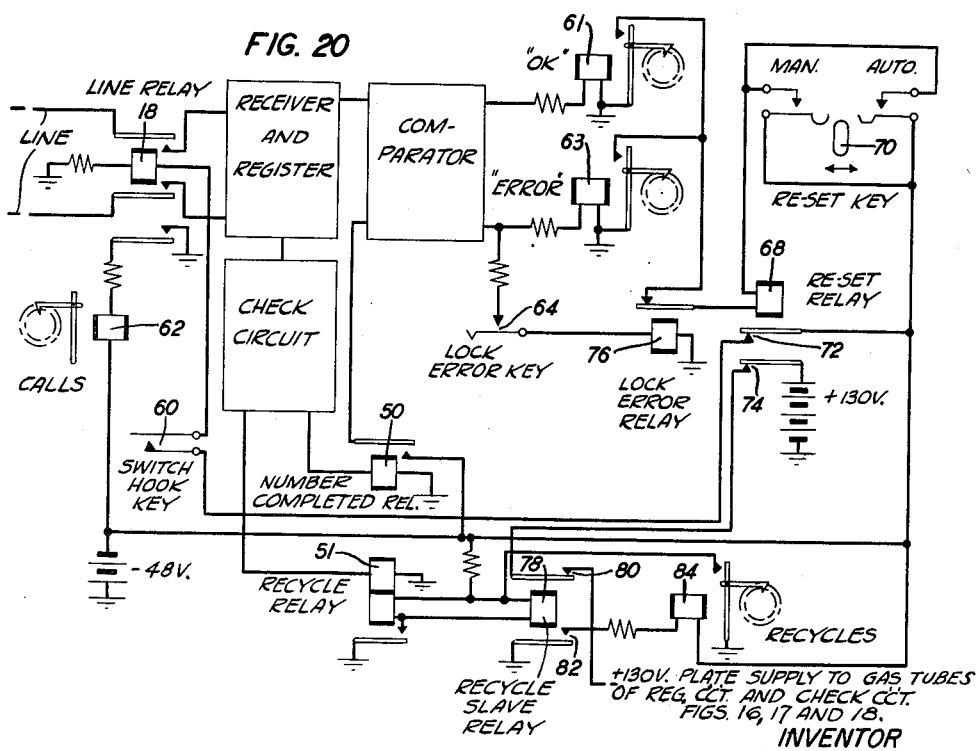
INVENTOR
C. A. LOVELL
BY John E. Cassidy
ATTORNEY

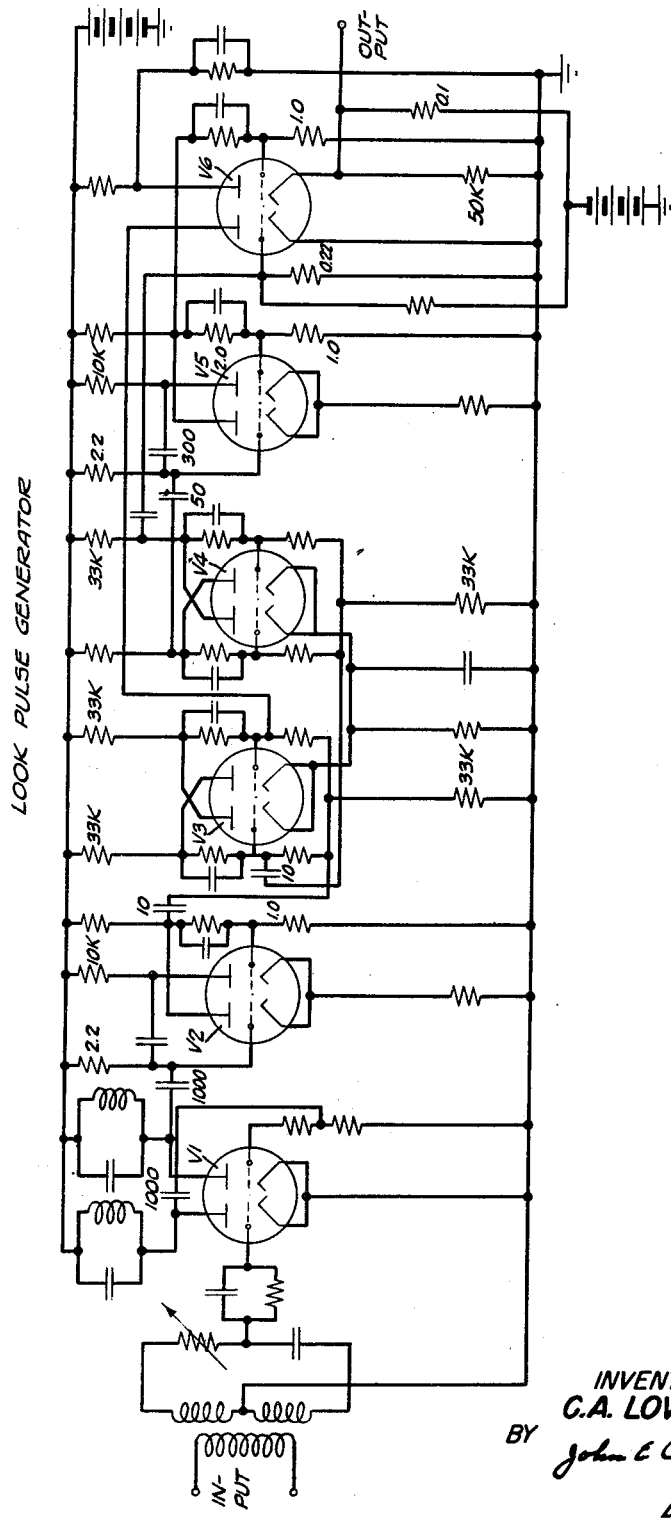

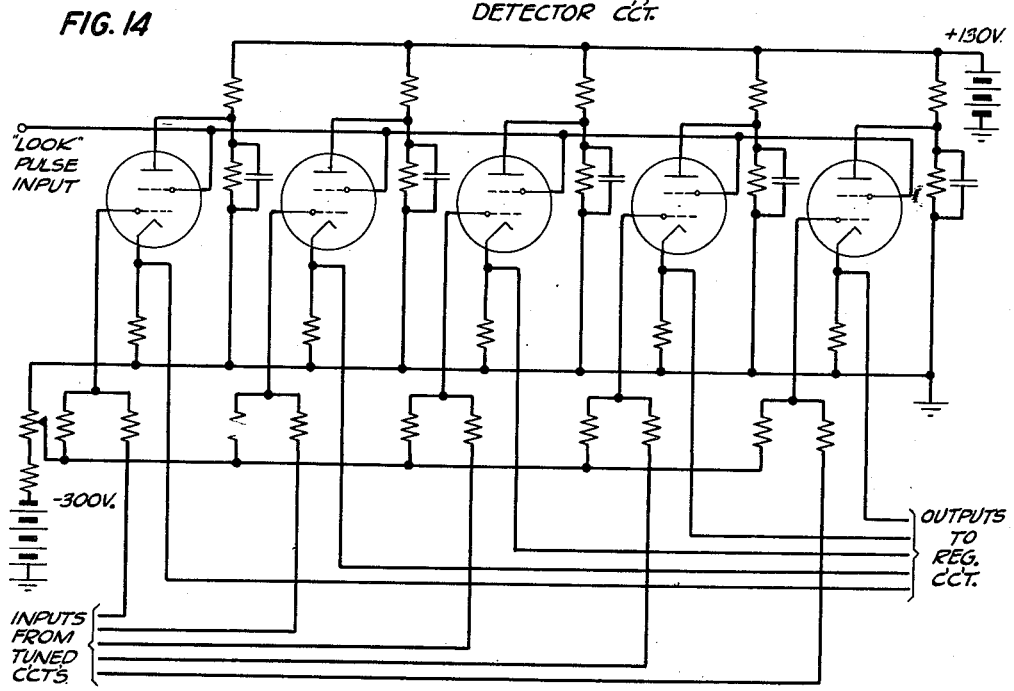
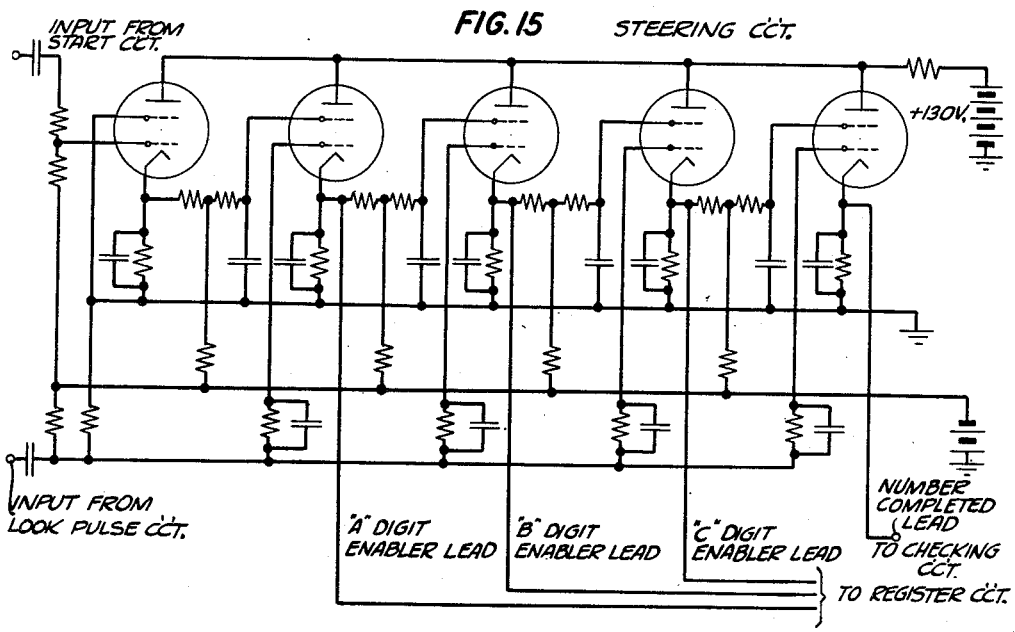

Nov. 3, 1953   C. A. LOVELL   2,658,189
SIGNALING SYSTEM BASED ON ORTHOGONAL FUNCTIONS
Filed Jan. 9, 1948   10 Sheets-Sheet 9
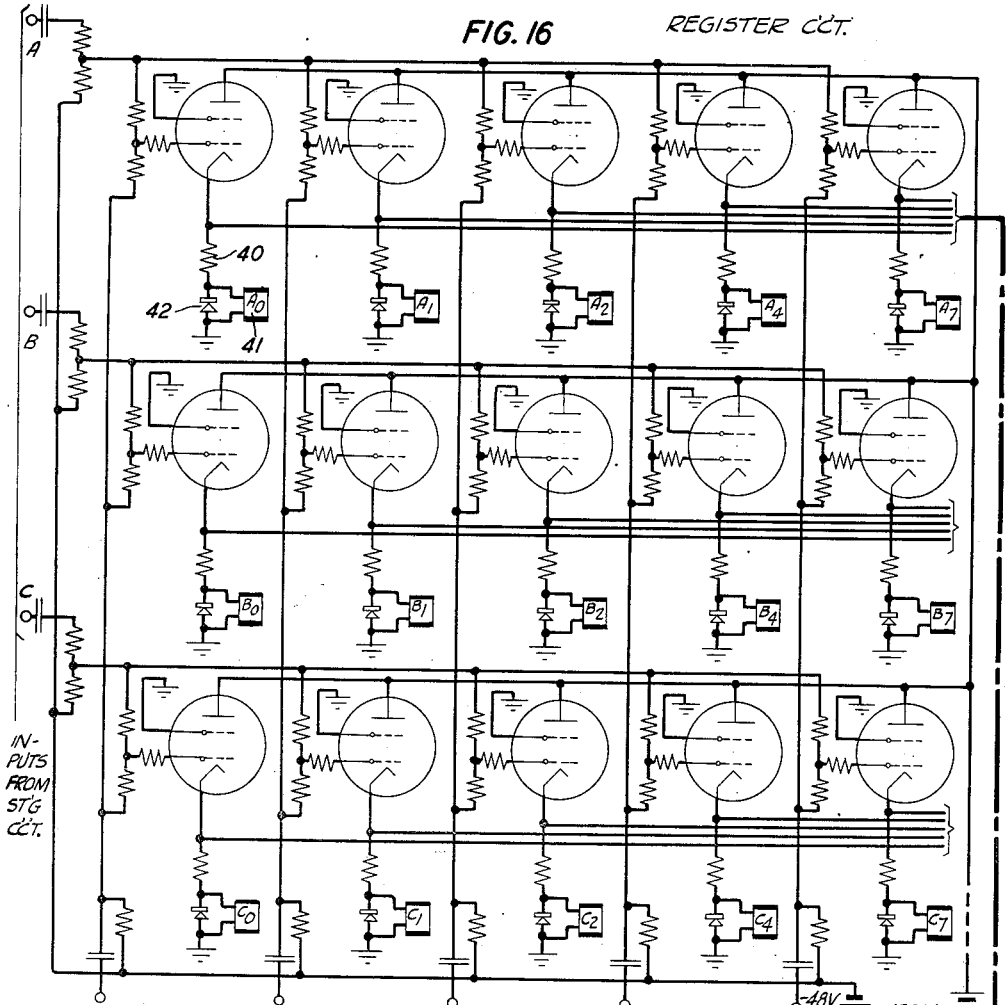
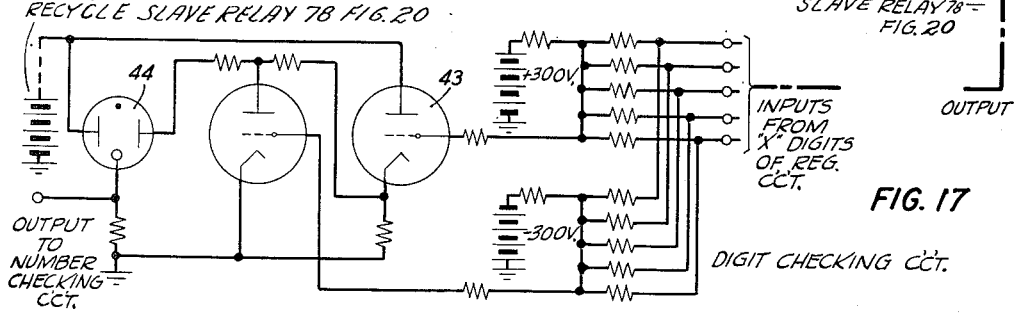
INVENTOR
*C.A. LOVELL*
BY
*John E. Cassidy*
ATTORNEY Nov. 3, 1953            C. A. LOVELL            2,658,189

SIGNALING SYSTEM BASED ON ORTHOGONAL FUNCTIONS

Filed Jan. 9, 1948            10 Sheets-Sheet 10

INVENTOR
C. A. LOVELL
BY
John E. Cassidy
ATTORNEY

UNITED STATES PATENT OFFICE 2,658,189

SIGNALING SYSTEM BASED ON ORTHOGONAL FUNCTIONS

Clarence A. Lovell, Summit, N. J., assignor to Bell Telephone Laboratories, Incorporated, New York, N. Y., a corporation of New York Application January 9, 1948, Serial No. 1,471

23 Claims. (Cl. 340—171)

This invention is a new system of signaling electrically and more particularly a new high speed system of electrical code signaling which may be applied, for instance, in communication code signaling such as in telegraph code signaling. The system of the invention may also be applied to advantage in transmitting signals from a subscriber station to control the operation of automatic electromechanical or electronic switching equipment at a telephone or telegraph switching station in establishing interconnections between calling and called stations, in passing information between control circuits in central offices, in signaling over toll circuits, and in such application the higher signaling speed attainable effects very large economy in the amount of switching equipment required. The maximum speed for non-interfering signals having no direct current component has been determined theoretically by H. Nyquist and published in his article "Certain Topics in Telegraph Transmission" in the "Transactions of the American Institute of Electrical Engineers," vol. 47, pp. 617-644, April 1928. The speed of the signals of the present system is equal to the theoretical maximum.

In any large automatic communication system as presently arranged, and as is generally well understood, in addition to the subscriber lines, link circuits, trunk circuits, etc., over which communication takes place after a connection is established, there is a considerable amount of complementary equipment such as sender circuits, decoder circuits or marker circuits, etc., which is connected temporarily to the communication path in order to establish the connection. This equipment is employed in common by all the subscriber lines connected to a large automatic exchange. Because of the complexity of the functions performed by this common complementary equipment, a large amount of apparatus is required in each complementary unit and it is consequently expensive.

When a call comes into an automatic exchange such equipment is automatically connected to the subscriber circuit before dialing commences. The dial trains are received by the common equipment which thereafter directs the course of the call through the proper channels to its destination.

As is also well understood, since the time presently required to complete a call requires that the establishment of a number of calls is in progress simultaneously, it is necessary to provide duplications of various units of the complementary equipment in number sufficient to handle the load expeditiously. The number of senders which are required for instance in a particular office is a function of the subscriber calling rate for the office and the length of time required by the sender to receive the dialed pulses and to direct the call through the proper channels before the sender may be disconnected. In a busy office as many as 200 to 300 senders may be required. The time a sender is connected depends on the vagaries of dialing and in an average case may be 10 to 12 seconds. In fact the most important factor entering into the time a sender is connected is the length of time required to receive the trains of dial pulses transmitted by the subscriber as the relative time required for directing is very short. The optimum conditions from point of view of the minimum number of senders, decoders, or markers, etc., which would be required would be a system in which a preset impulse transmitter is utilized to transmit the pulses instantaneously, and in which the pulses were received instantaneously and in which the sender might perform its directing instantaneously. With such an arrangement the minimum number of senders, possibly three or four, to take care of the incidence of simultaneous instantaneous sending, would suffice. As a result of combining the invention of the present signal code transmitting and receiving system, which approaches instantaneous transmission and reception, with preset devices for subscribers' use a very large reduction in holding time of the common equipment and consequently of the amount of such equipment required is achieved.

A more specific object of the present invention is a very large reduction in the amount of equipment required to effect connections in automatic electromechanical or electronic telephone, telegraph and other communication switching systems.

Another object of the invention is to provide signals which may be transmitted over toll lines and other circuits containing transformers, amplifiers and other elements which provide no path for transmission of direct current. Ordinary dial pulses and signals having direct current components are not suitable for such uses. The signals contemplated in this invention include many which are admirably suited for signaling over circuits which provide no direct current paths.

It is to be understood that while the proposed signaling system will find a very important application in reducing the amount of equipment required in effecting automatic switching of communication circuits in establishing the interconnections of such circuits by reducing the time of transmission and reception of code signals, the invention is essentially a high speed signaling system, which may be applied also in effecting the transmission and reception of the subject-matter of communications, such as telegraph code signals, television signals, telephoto signals as well as speech signals translated into code if desired.

There will be described herein the principles of two high speed signaling systems based on orthogonal functions. The mathematical equations describing the operation of each of the two systems are fully presented. The manner of implementing the theoretical considerations of the first system is described while the implementing of the second system in one of a number of possible physical embodiments is disclosed in complete detail.

The first of the two systems described herein makes use of orthogonal functions as they are defined in classical mathematics, while the second makes use of functions, closely related to but not identical with the classical functions.

The invention may be understood from the following description when read with reference to the associated drawings in which Figs. 1 to 4 inclusive apply on system 1 and Figs. 5 to 20 inclusive apply on system 2 and in which:

Fig. 1 is a block schematic of a receiving circuit for an orthogonal sine function signaling arrangement for system 1;

Fig. 1A is a block schematic of an alternative receiver for system 1 to be used with lines having appreciable phase shift;

Fig. 2 is a frequency converter, using regenerative frequency dividers, which is part of Fig. 1;

Fig. 3 is an electronic voltage multiplier employing non-linear elements, which is part of Fig. 1;

Fig. 4 is an electronic integrator which is part of Fig. 1;

Fig. 5 is a basic block schematic of the transmitter and receiver for an orthogonal function signaling circuit for system 2;

Figs. 6A and 6C are alternative receiving networks and Figs. 6B and 6D are alternative generating networks, which are parts of Fig. 5;

Figs. 7A to 7E are diagrams used in explaining the operation of system 2;

Fig. 8 is the transmitter of system 2;

Fig. 9 is a more complete block diagram of the receiving circuit of system 2;

Fig. 10 is the receiving amplifier, part of Fig. 9;

Fig. 11 is a start circuit, part of Fig. 9;

Figs. 12A to 12E are five diagrams used in explaining the operation of system 2;

Fig. 13 is a look pulse generator, part of Fig. 9;

Fig. 14 is a detector circuit, part of Fig. 9;

Fig. 15 is a steering circuit, part of Fig. 9;

Fig. 16 is a register circuit, part of Fig. 9;

Fig. 17 is a digit checking circuit, part of the checking circuit of Fig. 9;

Fig. 20 is a relay circuit used in interconnecting certain of the units of Fig. 9; and Fig. 21 is a transmitter for use with receivers of Fig. 1 or 1A.

Introduction

Figure 18:
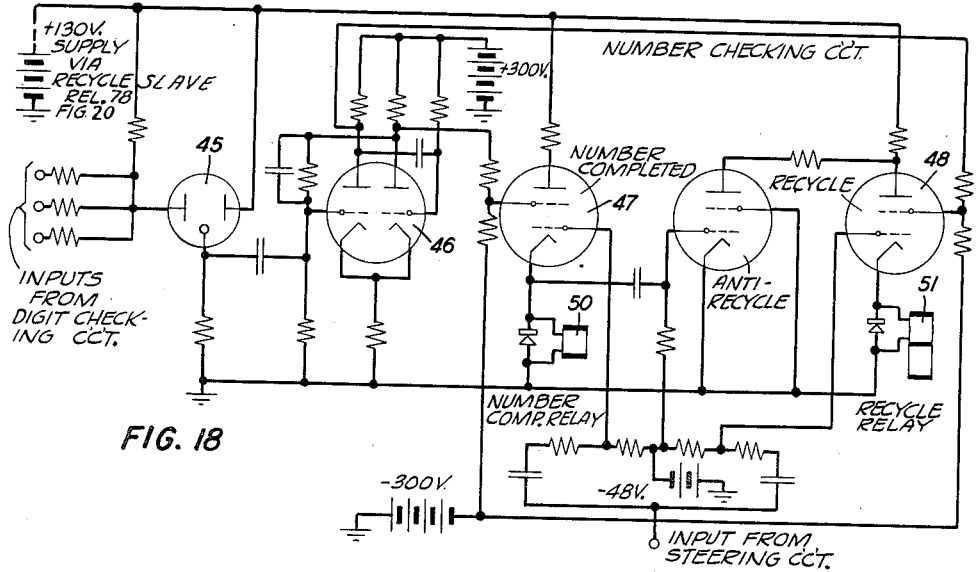
Fig. 18 is a number checking circuit, part of the checking circuit of Fig. 9.

A set of normalized time functions, $\varphi_1(t)$, $\varphi_2(t), \ldots \varphi_n(t)$ are said to be orthogonal over the time interval $\tau$ if $$\int_0^\tau \varphi_i(t)\cdot\varphi_j(t)dt=0,\ i\neq j \quad (1a)$$
$$\int_0^\tau \varphi_i(t)\cdot\varphi_j(t)dt=1,\ i=j \quad (1b)$$
$$(1)$$

If such functions are used in signaling systems direct use of this property can be made for separation of the signals at the receiving point. Functions satisfying (1) may be used directly in the separation of signals at the receiving point without employing reactive filter networks.

Studies of the possibilities of using functions satisfying (1) for signaling have suggested an extension of (1) which defines a new set of properties that may prove to be more useful than those resulting from (1). Consider a set of functions $\theta_1(t)$, $\theta_2(t) \ldots \theta_n(t)$ which over the time interval $\tau$, satisfy the conditions $$\int_0^\tau \theta_i(\lambda)\cdot\theta_j(T-\lambda)d\lambda=0,\ i\neq j \quad (2a)$$
$$\int_0^\tau \theta_i(\lambda)\cdot\theta_j(T-\lambda)d\lambda=1,\ i=j \quad (2b)$$
$$(2)$$

Conditions (2) are not identical with (1). Functions exist which satisfy both (1) and (2). Other functions satisfy respectively (1) or (2) but not both. For want of a better description at present conditions (2) will be regarded as an extension of the definition of orthogonality and functions satisfying (2) will also be called orthogonal. The practical importance, in the generation and reception of electrical signals, of functions which satisfy (2) is emphasized by pointing out the fact that the integral represents the response of a network, having an impulse response $\theta_i(t)$ to an applied signal of the form $\theta_j(t)$.

This application discloses the manner of implementing orthogonal functions in two signaling systems. The first system is based on functions satisfying (1). The second system is based on functions satisfying (2). In each case methods are used which are departures from conventional practices. In the mechanization of conditions (1) electronic computing elements are used in place of conventional filter networks for separating received signals. In the mechanization of (2) reactive networks are used but the instantaneous responses at particular times, rather than the steady state frequency characteristics, are used. The use of transient responses of networks in systems where signals are pulsed results in faster operation than may be realized by the more common methods of using steady state discrimination.

The first discussion of direct use of orthogonality in the separation of received signals will involve a two out of five combination code, such as utilized in the telephone switching system described in Patent 2,290,986, J. B. McKim, July 28, 1942. However, the class of functions discussed, instead of being limited to sinusoids, will be broadened to include any function satisfying (1) and the method of detection changed in accordance with the following disclosures.

Consider a set of five functions $\varphi_1(t)$, $\varphi_2(t)$, $\ldots \varphi_5(t)$ which are orthogonal over the time interval $\tau$. Let a set of ten signals $S_j(t)$ be defined by $$S_j(t)=\sum_1^5 A_{ij}\varphi_i(t) \quad (3)$$

where the A's are constants and have values for the respective values of $j$ as shown in the following table. This is obviously one of a great number of possible codes of this class. All that will be said about this will apply equally well to the whole class.

| $i$ | $A_{1j}$ | $A_{2j}$ | $A_{3j}$ | $A_{4j}$ | $A_{5j}$ |
|---|---|---|---|---|---|
| 0 | 1 | 1 | 0 | 0 | 0 |
| 1 | 1 | 0 | 1 | 0 | 0 |
| 2 | 1 | 0 | 0 | 1 | 0 |
| 3 | 1 | 0 | 0 | 0 | 1 |
| 4 | 0 | 1 | 1 | 0 | 0 |
| 5 | 0 | 1 | 0 | 1 | 0 |
| 6 | 0 | 1 | 0 | 0 | 1 |
| 7 | 0 | 0 | 1 | 1 | 0 |
| 8 | 0 | 0 | 1 | 0 | 1 |
| 9 | 0 | 0 | 0 | 1 | 1 |

The ten signals defined by (3) and (4) constitute suitable representation of a digit in a subscriber's number. A satisfactory code may therefore be set up in which the interval of transmission $\tau$ is divided into a number of subintervals $\tau_a$ equal to the number of digits to be transmitted. The same understandings about the order in which the various bits of information (the various digits) are to be transmitted that is used in conventional dial systems are essential parts of the code. In contrast to the complete separation of dial signals along the time axis two distinct electrical signals are transmitted simultaneously in each interval $\tau$.

At the receiving end it is sufficient to separate the signals into an array like that of Table 4. While this is not absolutely necessary and some other variant of the code might be used, we will ignore the possible translations and require of the receiving circuit the capability of reproducing Table 4 at the receiving end, when $S_j(t)$ is transmitted. This is accomplished in the first system by applying $S_j(t)$ simultaneously to five test circuits at the receiving point. Each test circuit has the function of testing the unknown signal for the presence of a particular one of the five $\varphi$'s. The steps involved are as follows: The $i$-th test circuit multiplies the signal $S_j(t)$ by $\varphi_i(t)$ and then integrates the product over the time interval $\tau$. These processes produce five integrals for each of the ten values of $j$, i. e., for each of the ten possible digital values. Let this set of fifty integrals be represented by $I_{ij}$ where $i=1,2,3,4,5$; $j=0,1,\ldots,9$. We have $$I_{ij} = \int_0^\tau \varphi_i(t)\left[\sum_1^5 A_{\alpha j}\varphi_\alpha(t)\right]dt \qquad (5)$$

Consider (5) for a given value of $j$, say $j=3$. We have $$I_{i3} = \int_0^\tau \varphi_i(t)[\varphi_1(t)+\varphi_5(t)]dt, \ (i=1,2,3,4,5) \qquad (6)$$

Equations (1) enable us to evaluate the five integrals as follows:

$$\begin{aligned}I_{13}&=1,\\ I_{23}&=0,\\ I_{33}&=0,\\ I_{43}&=0,\\ I_{53}&=1.\end{aligned} \qquad (7)$$

If similar evaluations are made for all values of $j$ and the results arranged in a tabular form similar to that of (4) we get

| $i$ | $I_{1j}$ | $I_{2j}$ | $I_{3j}$ | $I_{4j}$ | $I_{5j}$ |
|---|---|---|---|---|---|
| 0 | 1 | 1 | 0 | 0 | 0 |
| 1 | 1 | 0 | 1 | 0 | 0 |
| 2 | 1 | 0 | 0 | 1 | 0 |
| 3 | 1 | 0 | 0 | 0 | 1 |
| 4 | 0 | 1 | 1 | 0 | 0 |
| 5 | 0 | 1 | 0 | 1 | 0 |
| 6 | 0 | 1 | 0 | 0 | 1 |
| 7 | 0 | 0 | 1 | 1 | 0 |
| 8 | 0 | 0 | 1 | 0 | 1 |
| 9 | 0 | 0 | 0 | 1 | 1 |

(8)

It is seen that the array of Table 8 is identical with that of Table 4. Hence the $I$'s represent digits in identically the same manner as do the $A$'s, and consequently a receiving circuit having properties as described will be satisfactory.

First system

Refer now to Fig. 1 which shows a block schematic of a receiving circuit which makes use of electronic computing elements to carry out the indicated mathematical processes. In this circuit no filters are used in the separation of pulsed signals. Frequency selective networks are shown in the function of providing steady state signals for computing purposes. In many useful systems these signals would be provided at the receiving end and no filters would be involved in the receiver.

To illustrate this method sinusoidal functions belonging to an orthogonal set will be used. It will be assumed that the coding is in accordance with Equation 3 and Table 4. For definiteness a set of frequencies will be chosen, though it is not implied that the chosen set is the best available set. The system described is adapted to receive signals from a preset subscriber's signaling mechanism and the values assumed for some of the parameters are chosen with that application in mind. There are many ways well known in the art for the generation of sinusoidal signals having properties as stated.

Let the received signal $S_j(t)$ be of the form $$S_j(t) = \sin 9\omega t + \sum_1^5 A_{\alpha j}\sin(11+\alpha)\omega t \qquad (9)$$

The term $\sin 9\omega t$ is used for timing and computing. It is either not pulsed at all or is pulsed with a view to the control functions which it must perform. The arrangement per Fig. 21 may be employed to generate and transmit the signals by operating any two of keys K1 to K5 simultaneously to impress the desired combination of two sinusoidal voltages on the line to the receiver, while voltage source 6, which generates the voltage $\sin 9\omega t$, used for tuning and computing, remains connected to the line at all times. In Fig. 1 a band-pass filter is used to select the steady state term $\sin 9\omega t$ which is applied to a frequency converting circuit. This circuit generates and filters to the desired degree all the frequencies needed for control and computation. One way of achieving the frequency conversion is shown in Fig. 2 and a brief discussion of the frequency conversion problem is given in a later paragraph. The frequencies required are the 12th to 16th harmonics inclusive, of the fundamental frequency, $f$, which frequency is not used directly. Suitable means for stabilizing the amplitudes of these sine waves against the pulsing transient are available and well known.

The circuits $M_1$ to $M_5$ inclusive of Fig. 1 are electronic multipliers, having the property that if $E_1(t)$ and $E_2(t)$ are applied to the respective input terminals, the output $E_0(t)$ is given by $$E_0(t) = E_1(t) \cdot E_2(t) \qquad (10)$$

The outputs of the multipliers in Fig. 1 are given by $$E_{\beta j}(t) = \sin(11+\beta)\omega t \cdot S_j(t) \qquad (11)$$

or $$E_{\beta j}(t) = \sin(11+\beta)\omega t\left[\sin 9\omega t + \sum_1^5 A_{\alpha j}\sin(11+\alpha)\omega t\right] \qquad (12)$$

The crcuits of Fig. 1 denoted by $\Sigma_1$ to $\Sigma_5$ inclusive are electronic integrators of a type which has been highly developed for military computers. The outputs of the integrators are given by $$I_{\beta j}(t) = \int_0^t \sin(11+\beta)\omega t \left[ \sin 9\omega t + \sum_1^5 A_{\alpha j} \sin(11+\alpha)\omega t \right] dt \quad (13)$$

Suppose that the control circuit is arranged to start and stop the integration process so that the integrals are evaluated over exactly one period of the fundamental frequency $f$. Let this time interval be $\tau$. Over this interval all the signal functions are orthogonal to $\sin 9\omega t$. Each integral is made up of the sums of three integrals. Due to the fact that $$\int_0^\tau \sin(11+\beta)\omega t \sin 9\omega t \, dt = 0, \quad 0 \leq \beta \quad (14)$$

for all positive integral values of $\beta$ the values of (13) will be unchanged if $\sin 9\omega t$ is eliminated from each integrand. Hence for the interval $\tau$ (13) may be written $$I_{\beta j} = \int_0^\tau \sin(11+\beta)\omega t \left[ \sum_1^5 A_{\alpha j} \sin(11+\alpha)\omega t \right] dt \quad (15)$$

If a suitable normalizing factor is applied, each of the fifty integrals may be evaluated through use of (1), and the results can be arranged into a table identical with Table 8.

Circuit elements of Fig. 1

Refer now to Fig. 1. This figure shows several different kinds of circuits the respective functions of which are indicated by the above description. Some of the methods by which the indicated functions are accomplished will now be discussed.

Frequency converter

Refer now to Fig. 2. Fig. 2 shows how all the required sinusoidal voltages may be derived from $\sin 9\omega t$ through use of regenerative frequency dividing networks, frequency doublers, modulators and frequency selective networks. This circuit is based on conventional practices. These practices are disclosed for instance in a paper entitled "A Secondary Frequency Standard" F. R. Stansel, Proceedings of the Institute of Radio Engineers, April 1942. It is seen from Fig. 2 that the derivation of the necessary frequencies from $9f$ involves quite a few operations. The difficulties may be softened somewhat by fairly easy requirements. Each modulator or frequency doubler can be a single vacuum tube or copper oxide assembly while the band-pass filters indicated may be replaced by simple tuned circuits.

Other methods for generation of the steady state waves at the receiving point may be substituted for that shown. Rotating machinery driven in synchronization with the received signal, and controlled oscillators are illustrative. In cases where interoffice signaling is involved all required signals may be made available at all points in steady state form so that the frequency conversion system can be omitted entirely.

Electronic multipliers

Most modulators are approximate multipliers in which the pure product although not accurately scaled is included among the outputs. For most purposes they are made satisfactory through the process of using frequency selective networks to pass the desired product and to exclude all other terms which appear in the output. Fig. 3 shows a method for electronic multiplication which involves a non-linear element. If the element has a square law characteristic the multiplication is precise.

The operation of this circuit is based on the algebraic identity $$A \times B \equiv \frac{1}{4}[(A+B)^2 - (A-B)^2] \quad (16)$$

No circuit elements are available in which the outputs $E_0$ are related to the inputs $E_i$ precisely by the relation $$E_0 = kE_i^2 \quad (17)$$

where $k$ is a constant. However a large number of elements are found having approximately this response. The circuit of Fig. 3 can be adjusted to improve the approximation. Typical of such adjustments are those which may be made to make the output zero when one of the inputs is made zero or one which will make the output precise when A and B are set at given values.

Other facts which indicate that an approximation to a square law element will suffice is that in Fig. 1, one factor of each product is furnished locally and its amplitude is a constant. Suppose this is represented by A. If it is scaled in relation to B so that the range between $A+B$ and $A-B$ is relatively narrow a better approximation can be realized than would be possible over wider volume ranges. This situation is still further eased by the limited forms which $S_j('t)$ may have, i. e., the limited range of B itself. Any violence to the scale factor of the product which may be done by taking such liberties with those of the factors can be rectified by over-all circuit adjustments.

For the non-linear elements, copper-oxide, vacuum tubes, etc., offer fairly good approximations over limited ranges. Thus the circuit of Fig. 3 may be constructed from conventional components. Other circuits might give good enough approximations under the conditions outlined but the pulsating character of one of the factors must be remembered and filters or other networks having appreciable time constants are to be avoided.

Integrators

Good electronic integrators are now available. They consist essentially of amplifiers with feedback controlled by a resistance and a condenser as shown in Fig. 4. In order that integrals of the type involved in the orthogonal systems be included in those which may be evaluated by the circuit of Fig. 4 the pass-band of the amplifier must include zero frequency, i. e., direct current. This requires stable direct current amplifiers which are now also well known in the art. The limits of integration can be introduced into the integration process by maintaining a short on the feedback condenser up to the instant the integration is to begin. The signals may be applied continuously to the inputs without causing outputs to differ from zero in this condition if the inherent gains of the amplifiers are large. The integration is started by removing the short from the condenser. The time of this operation corresponds to zero time. The integration is terminated by applying a short circuit to the input terminals. If this is done $\tau$ seconds after the start of the integration the output of the circuit of Fig. 4 will be $$e_0 = \frac{-1}{RC}\int_0^\tau E_i(t)\,dt \qquad (18)$$

The circuit will hold this voltage without appreciable change for considerable time, provided the input terminals remain shorted, and will deliver current to a fairly low resistance load while doing so. Therefore, the only additions to Fig. 4 necessary to make the integrator suitable for use in Fig. 1 are the means for controlling the timing of the shorts between the correct pairs of contacts.

Control circuit

The functions of this circuit are:

(1) Recognize the arrival of a keyed signal and start the integrations at the proper time.
(2) Time the intervals over which integrals are evaluated.
(3) Stop integrations at proper time.
(4) Connect registers to outputs of integrators.
(5) Prepare circuits for next signal.
(6) Perform miscellaneous and incidental functions.

Each of these functions will be accomplished by conventional circuits well understood by those skilled in the art. For instance, the arrival of a keyed signal can be recognized in a sensitive manner by a circuit in which the steady state Sine$9\omega t$ is suppressed by a band elimination filter or other means and which embodies a differentiator to respond to the steep wave fronts of the pulses. Such a circuit or many of its possible variants will give all the sensitivity which the noise conditions on the line will allow. As another illustrative example, the accurate timing required can be accomplished by electronic counting mechanisms operating to count waves of the highest frequency, in this case 16$f$. The accuracy of the timing can be held to a small fraction of a cycle of the 16$f$ wave by amplification and peak chopping which gives a sharply rising wave front to operate the counter. Accurate timing is important in this system. Binary counters, which count to 16 to give the period of exactly one full wave of the fundamental, may be used and this consideration was involved in the choice of the 16th harmonic as the highest frequency. An auxiliary counter which counts two or more waves to allow transients to die out before integration is started can be provided if necessary. This is an example of the type of incidental functions listed in the miscellaneous item (6).

Register connector and register

The art is similar to that of registering numbers now being employed in telephone switching systems except for the increase in speed which is required for high speed preset signaling. This requires the well understood replacement of relays by electronic elements in the register and connector circuits for Fig. 1. These circuits may be the same as those performing corresponding functions in the second system to be described in detail hereunder.

Second system.—Transient responses of networks

The mechanization of conditions (2) for signaling purposes to be described below is significantly different from that described for system 1 above. In place of electronic computing elements to perform multiplications, integrations, etc., under influence of a common control circuit this plan makes use of the transient response of networks to convey the required intelligence.

Consider a set of five networks having impulsive responses given respectively by the time functions $G_1(t), G_2(t), \ldots, G_5(t)$, which satisfy conditions (2) over a time interval $\tau$. Suppose two identical sets of such networks be arranged as shown in the block schematic of Fig. 5. The particular circuit of this figure is considered for possible use in interoffice signaling through manually operated key pulsing or automatic keying means.

The box labeled "key circuit" of Fig. 5 is assumed to apply short pulses to successive pairs of the networks in accordance with Table 4 and Equation 3. The responses of the energized networks are respectively the functions $G_1(t)$, $G_2(t), \ldots, G_5(t)$. These responses are added linearly and transmitted over the line. It is to be understood that the signals may be transmitted instead by an automatic keying mechanism a number of which are well known in the art. In the operation of the receiver described in detail hereinafter it is assumed that an automatic keying mechanism is employed.

At the receiving end of the line the summation signals are applied to all the receiving networks. The response of the $i$-th network to any signal $Sj(t)$ is $$I_{ij}(t) = \int_0^t G_i(\lambda) S_j(t-\lambda)\,d\lambda \qquad (19)$$

Let us consider $Sj(t)$ as given by $$S_j(t) = \sum_1^5 A_{\alpha j} G_\alpha(t) \qquad (20)$$

where the values of $A_{\alpha j}$ are given by Table 4. We have through substitution in (19)

$$I_{ij}(t) = \int_0^t G_i(\lambda)\left[\sum_1^5 A_{\alpha j} G_\alpha(t-\lambda)\right] d\lambda \qquad (21)$$

Each integral (21) is seen to be the sum of two integrals of the type involved in conditions (2). If it is assumed that when evaluated over a time interval $\tau$ the $G$'s satisfy conditions (2), then the fifty integrals (21) have their respective values given by Table 8.

In this case the multiplications and integrations indicated by the formulae for $I_{ij}(t)$ are performed by the networks in their responses to the signals applied. The integration process starts at the time of arrival of the signal and if the value of the integral $t$ seconds later is to be observed the time of arrival of the signal must be noted by a start circuit which starts some sort of time keeper to inform the control circuit of the proper time to sample the response voltages of the receiving circuits. In fact all the control functions listed above for the other system may be needed for the implementation to this system.

There remains to be discussed the question of existence of functions satisfying (2). It is of interest to determine whether functions exist satisfying both (1) and (2). A comparison of the integrals will show that if $$G_i(\lambda) = G_i(\tau - \lambda) \qquad (22)$$

the conditions (1) and (2) reduce to identical conditions. Condition (22) is merely that the $G$'s have even symmetry about the center of the interval $\tau$. If only the magnitudes of the integrals are significant either even or odd symmetry about this point is permitted.

No attempt will be made here to discuss the most general solution of (2). An interesting and important particular solution which does not satisfy (1) is as follows:
Let
$$G_k(t) = \epsilon^{-\alpha t/\tau} \sin k\pi t/\tau, \quad t > 0 \qquad (23)$$
and consider the response obtained by applying the signal
$$E_m(t) = \epsilon^{-\alpha t/\tau} \sin m\pi t/\tau \qquad (24)$$
to a network whose impulsive admittance is
$$G_n(t) = \epsilon^{-\alpha t/\tau} \sin n\pi t/\tau \qquad (25)$$
The response is
$$V_{mn}(t) = \epsilon^{-\alpha t/\tau} \int_0^t \sin m\pi\lambda/\tau \cdot \sin n\pi(t-\lambda)/\tau \, d\lambda \qquad (26)$$
When evaluated (26) gives
$$V_{mn}(t) = \frac{\tau \epsilon^{-\alpha t/\tau}}{\pi(m^2 - n^2)}[m \sin n\pi t/\tau - n \sin m\pi t/\tau] \qquad (27)$$
if $m \neq n$, or
$$V_{nn}(t) = \epsilon^{-\alpha t/\tau}[\sin n\pi t/\tau - n\pi t/\tau \cos n\pi t/\tau] \qquad (28)$$
if $m = n$.

If $\tau$ is substituted for $t$ (27) and (28) give respectively
$$V_{mn}(\tau) = 0 \qquad (29a)$$
$$V_{nn}(\tau) = (-1)^{n+1}\frac{\tau\epsilon^{-\alpha}}{2} \qquad (29b)$$

Thus we see that, by using a normalizing factor
$$\sqrt{2\epsilon^{\alpha/\tau}}$$
the functions $G_k(t)$ defined by (23) are made to satisfy Equations 2.

The importance of solutions of Equations 2 having the form of damped sine waves is greatly enhanced by the fact that the functions are generated precisely by simple networks.

There are probably a large number of mathematical functions which satisfy (2). However for the majority of such functions it is likely that no physical networks exist, the impulsive responses of which are precisely such functions. Use of such functions would require their approximation with networks on a curve matching basis. This will tend to complicate the networks, require acceptance of approximation errors or result in compromises in which both drawbacks appear to some degree. The accurate generation of the damped sinusoids with simple tuned circuits is therefore of prime importance.

In use of these functions the accuracy of the results will depend largely on control of the elements in constructing networks and in the accuracy of timing the interval $\tau$. To focus attention on the effects of timing errors let us replace $\tau$ by $\tau+\delta$. For sufficiently small values of $\delta$
$$V_{mn}(\tau+\delta) = (-1)^n \frac{mn\pi^2\tau\epsilon^{-\alpha}}{3!}(\delta/\tau)^3 \qquad (30)$$
and
$$V_{nn}(\tau+\delta) = (-1)^{n+1}\frac{\tau\epsilon^{-\alpha}}{2}\left[1 - \alpha\frac{(\delta)}{(\tau)} - \frac{1}{2}[(n\pi)^2 - \alpha^2](\delta/\tau)^2\right] \qquad (31)$$

The approximate expression (31) for $V_{nn}(\tau+\delta)$ has a maximum value
$$V_{max} = (-1)^{n+1}\frac{\tau\epsilon^{-\alpha}}{2}\left[1 + \frac{1}{2}\frac{\alpha^2}{(n\pi)^2 - \alpha^2}\right] \qquad (32)$$
for
$$\frac{\delta}{\tau} = -\frac{\alpha}{(n\pi)^2 - \alpha^2} \qquad (33)$$

let us consider the specific case where
$$\alpha = 1, \quad \tau = \frac{1}{100}, \quad m, n = 10, 12, 14, 16, 18 \qquad (34)$$
To obtain the maximum given by (32) to within a per cent or so, requires timing of the order of accuracy of $10^{-5}$ seconds. However consider the results obtained if
$$-\frac{1}{72} < \frac{\delta}{\tau} < \frac{1}{72} \qquad (35)$$
that is if a timing error of not more than a quarter cycle of the highest frequency is permitted. In terms of units of
$$\frac{\tau\epsilon^{-\alpha}}{2}$$
and to the degree of approximation used
$$V_{16,18}(\tau+\delta)$$
does not exceed .00254 while $V_{18,18}(\tau+\delta)$ is at least .692. In fact under these conditions all $V_{mn}(\tau+\delta)$ with $m \neq n$ will not exceed .00254 while all $V_{nn}(\tau+\delta)$ will not be less than .694, a discrimination of more than 270:1.

The simple receiving network of Fig. 6A has the assumed form of impulsive impedance when $V(t)$ is taken as the open circuit output voltage. The Q of the coil in this figure at the frequency
$$\frac{n}{2\tau}$$
cycles per second is
$$Q = \frac{n\pi}{2\alpha} \qquad (36)$$
For the assumed values the Q's of the five circuits are respectively

| f | Q |
|---|---|
| 500 | $5\pi$ |
| 600 | $6\pi$ |
| 700 | $7\pi$ |
| 800 | $8\pi$ |
| 900 | $9\pi$ |

Discussion has been carried out on the basis of identical networks for receiving and generating the signals. As a matter of fact it is not easy to approximate the theoretical pulse to a network. It is better to rearrange the generating networks so that a step function may be applied in place of the pulse. Such a rearranged network is shown in Fig. 6B.

The Q's indicated by Table 37 are easy to obtain at the respective frequencies. However the Q's have to be fairly well controlled as there are ten networks involved, divided into two groups and located at different positions. Accurate control of the initial values of the Q's as well as the frequencies might be easier to accomplish in circuits like those of Figs. 6C and 6D. These circuits represent respectively alternative receiving and transmitting networks. The Q's and the frequencies are fixed by resistances and condensers only. In general such networks can be made less sensitive to temperature, signal levels and aging effects than can the ferromagnetic materials needed to get the Q's in the networks involving coils.

Details of system 2

Following is a detailed description of the construction and performance of a preferred embodiment of system 2. The system here described embodies certain features which are not basic to the invention but which were included in the system as actually constructed for the purpose of facilitating a study of its performance. It is to be understood that a system implementing the inventive concept of system 2 may take other forms which will readily suggest themselves to those skilled in the art.

As explained in the foregoing this system extracts the desired intelligence from the instantaneous response of tuned circuits. While the feedback amplifier type of signal generator and receiver has been employed successfully in an embodiment of system 2, experience has shown that the best results are obtained through the use of passive tuned circuits.

Refer now to equations numbered 24 to 29b. If we let $\tau = .005$ sec.
$a = 1$
$m, n = 5, 7, 9, 11, 13$ the signals of equation (24) are damped sine waves of frequencies 500, 700, 900, 1100, and 1300 cycles. It should be noted that $n=10$ gives a 500-cycle frequency in the example illustrating the effect of timing errors due to the fact that $\tau=.01$ instead of .005 assumed here. These signals as explained in the foregoing can be generated by applying a step function of voltage to a dissipative series-resonant circuit and observing the voltage across a part of the damping resistor. Since the signal needs only to last beyond time $t=\tau$, the applied voltage may be a square pulse of, say, 6 milliseconds duration. If a digit repetition rate of 100 digits per second is chosen, this gives a period of 4 milliseconds for deenergizing the tuned circuits between digits. Fig. 7A shows a circuit for exciting the tuned circuits and for damping out the oscillations between digits. In effect, a positive voltage step is applied to an oscillatory network to produce a damped oscillation. Resistance 1 determines the oscillation damping. When the positive voltage is removed later on, effectively applying a negative step to the network, no oscillation is produced because the critical damping resistance 2 is simultaneously introduced into the network, making it non-oscillatory. Fig. 7B shows the transmitted signal for the case $m=9$.

Equation 25 is satisfied by a dissipative series-resonant circuit, with the voltage across the condenser taken as the output, as in Fig. 7C. Fig. 7D shows the output of such a circuit for the case $m=9$; Fig. 7E shows the output for the case $m=9$, $n=7$.

Transmitter

Refer now to Fig. 8. For sending out signals described by equation 23 in a two-out-of-five code, the transmitter contains five tuned circuits, 11 to 15 inclusive, one for each value of $m$, and means for keying the ten possible pairs of circuits in any desired order at the desired repetition rate of 100 digits per second. Fig 8 shows the transmitter arranged to transmit an 8-digit number followed by a quiet interval two digit periods in length to indicate completion of the number. In a commercial signaling system means would be provided to turn off the transmitter after satisfactory reception and interpretation of the signal information. For testing purposes, however, the transmitter may run continuously. The present testing arrangement uses the 60-cycle power lines as its fundamental timing reference. A synchronous driving motor, not shown but operated from the same power source, provides proper timing of the transmitter. The stepper 16 rotates one step per digit, while the key 17 closes once per digit after the stepper has taken its position.

Receiver

A block diagram of the testing receiver for this orthogonal function signaling system is shown in Fig. 9. A general description of the receiver operation is given below, while the component circuits are described in detail individually hereinafter.

When the line relay 18 closes, the received signals, after amplification by the low-output impedance-receiving amplifier 19, are fed to the five receiving tuned circuits 21 to 25 inclusive and the "start" circuit 26. The line relay may close at any point in the train of signals; the function of the start circuit 26 is to make the register 27 unresponsive to incoming signals until the quiet interval in the train has occurred, thus ensuring that registration of a received signal will begin with the first digit in a transmitted sequence.

The outputs of the receiving tuned circuits are fed to the detector 28. The detector 28 is normally disabled; but a "look" pulse, synchronized with the 60-cycle power line which controls the timing of the transmitted signals, enables the detector for a period of about 0.25 millisecond, centered at a time 5 milliseconds after the beginning of each received digit signal. During this interval equations 29a and 29b are satisfied to a close approximation, and the detector will then send out pulses along only two of the five leads to the register circuit.

Until the quiet interval occurs in the train of received signals, the register circuit does not respond to the signals from the detector. When a quiet interval does occur, the start circuit primes the steering circuit. At the time of the first look pulse after the quiet interval, the steering circuit enables the digit A section of the register circuit, and the first digit of the transmitted signal is stored. Succeeding look pulses enable succeeding sections of the register circuit, and the remaining digits of the number are stored in the same way. At the time of the look pulse following the last digit to be registered, the steering circuit delivers a signal indicating that the number is completed. In the testing system only the first three digits of the transmitted number are registered. More digits could be registered in the same manner. The number completed signal, therefore, occurs at the time at which the fourth digit would be recorded in a larger register circuit.

The information stored in the register circuit is fed to a checking circuit 29 which determines whether a signal is registered in exactly two out of the five channels for each digit. If the number is plausible, as indicated by two-out-of-five operation for each of the three digits registered, the information is retained. If the number is implausible, because more or less than two channels register signals for any of the three digits, a "recycle" relay operates. All the stored information is then discarded and the system attempts on a succeeding repetition of the transmitted number to register plausible signals.

In addition to operating the checking circuit, the registered information can be used in any way dictated by the requirements of the over-all signaling problem. For testing purposes the information is used to operate a comparator circuit 30 which checks the received number against a replica of the number chosen for transmission and records the result on an "OK" or an "Error" message register. A visual comparison by means of switchboard lamps is also provided.

Receiving amplifier

Refer now to Fig. 10.

The receiving amplifier, Fig. 10, consists of a 3-stage amplifier with shunt feedback around the last two stages. The output impedance is in series with the damping resistance of the receiving tuned circuits and it is therefore required to be either very low or very constant. Accordingly, the output stage was made a cathode follower with an output impedance of around 250 ohms and this impedance was reduced by the feedback to a value of about 3.5 ohms. This is adequately low, since the tuned circuit resistances are between 200 and 600 ohms.

Start circuit

Refer now to Fig. 11 and to Figs. 12A to 12E.

The occurrence of a dead interval in the succession of digit signals is recognized by observing the voltage to which the 0.1-microfarad timing condenser 31 charges. This condenser tends to charge to 300 volts but is discharged periodically by the 2050 gas tube $V_1$, which is fired by the signal at the output of the receiving amplifier each time a digit is received. After firing, the 2050 tube $V_1$ extinguishes itself and the condenser begins to charge again. Fig. 12A shows the spacing of the incoming signals. As long as digits are received regularly at 10-millisecond intervals the voltage across the condenser 31 is a sawtooth wave never rising higher than about 40 volts. A series of wave forms showing the sequence of events are given in Figs. 12B to 12E. When a digit is not received, however, the voltage continues to rise. Tube $V_2$ is a differential amplifier which compares the condenser voltage with a reference voltage obtained from a potentiometer. As long the the condenser voltage is less than the reference voltage, the right-hand half of $V_2$ is conducting. When the condenser voltage becomes equal to the reference voltage, conduction shifts abruptly to the left-hand triode of $V_2$. The reference voltage is adjusted so that the differential amplifier will switch only after two successive digits have failed to occur. Transfer of conduction from the right-hand to the left-hand side of the differential amplifier triggers a single-shot multivibrator, $V_3$, which delivers a pulse of the order of 9 milliseconds long. The trailing edge of this pulse triggers another single-shot multivibrator, $V_4$, which delivers a pulse about 80 milliseconds long. The pulse from $V_4$ contains the information desired since it appears only after the occurrence of a dead interval in the train of received signals and lasts for the duration of a complete received number.

Look pulse generator

Refer now to Fig. 13.

The look pulse occurring at a 100-cycle rate and synchronized with the 60-cycle supply is produced by generating the fifth harmonic of 60-cycles, counting cycles of this 300-cycle wave, and generating a short square pulse at every third cycle. Tube $V_1$ is the harmonic generator. Tube $V_2$, a single-shot multivibrator, generates a short pulse at each cycle of the 300-cycle wave. Tubes $V_3$ and $V_4$ and half of $V_6$ make up a reentrant binary counting circuit, which counts these pulses and at each third pulse triggers the single-shot multivibrator $V_5$. $V_5$ generates the look pulse, and the remaining half of $V_6$ is a cathode follower output stage. The output lead is normally at a potential of —50 volts with respect to ground and at the occurrence of the look pulse is raised to ground potential for a period of approximately 0.3 millisecond. A phase shifter at the input of the harmonic generator is provided to adjust the time at which the look pulse occurs.

Detector

Refer now to Fig. 14.

The detector circuit consists of five RCA 2050 gas-filled tetrode tubes, one for each channel. The grid bias is adjusted so that when the screens are at ground potetnial the tubes will fire on positive half cycles of the signals from the tuned circuits. The screens, connected to the output of the look pulse generator, are normally at —50 volts with respect to ground and are raised to ground potential only at the time of the look pulse. For each digit the two tubes receiving desired signals will fire. After firing the tubes extinguish themselves on account of the long time constant resistance-condenser networks in their plate circuits. The outputs are in the form of short sharp positive pulses across the cathode resistors.

Steering circuit

Refer now to Fig. 15.

The steering circuit is composed of five RCA 2050 gas-filled tetrode tubes in a stepping chain of fairly conventional form. The first tube is fired by the leading edge of the output pulse from the start circuit. In firing, the first tube primes the second by raising its screen to ground potential. The first look pulse following the output pulse from the start circuit fires the second tube and primes the third. Presence of voltage on the cathode of the second tube indicates that digit A of the transmitted number is being received. The voltage drop across the common plate resistance when the second tube fires causes the first tube to extinguish. At the next look pulse the third tube fires and extinguishes the second, and so on down the chain. Presence of voltage on the cathode of the last tube indicates that the received number is completed. The last tube remains fired until another signal is received from the start circuit, on a repetition of the same call, or until extinguished by the reset operation at the completion of the number registration.

Register

Refer now to Fig. 16. The register circuit consists of an array of RCA 2050 gas-filled tetrode tubes, five for each digit to be registered. The signal on the grid of each tube consists of the sum of a pulse from the detector circuit and a pulse from the steering circuit. A tube will fire when both of these signals are present together, but not when either signal is present alone. The voltages at the cathodes of the register tubes are used as inputs to the checking circuit described below. The current passed by each tube flows through a current limiting resistor such as 40 and through the winding of a relay such as 41. Only the relay winding is shown here, since the contacts are considered a part of the comparator circuit. Shunted across the relay winding is a varistor such as 42 to prevent the appearance of voltage surges at the cathode of the register tube when the tube is extinguished by removing the plate supply.

Check circuit

Refer to Figs. 17 and 18.

The function of the checking circuit is to make sure that exactly two desired signals are received on the five channels for each digit. The circuit as built performs this operation in two steps. The first check considers each digit individually and the second check ensures that the whole number is made up of three individually satisfactory digits.

The circuit for first check is shown in Fig. 17, one of which is required for each digit. The voltages from the cathodes of the five register tubes for a particular digit are summed with a positive bias and applied to the grid of a cathode follower 43. The voltage from the cathode of the cathode follower is applied to the starter anode of a 313CA gas tube 44. This voltage consists of a component proportional to the number of register tubes fired, superimposed on a constant component so chosen that when two or more tubes are fired the resultant voltage is sufficient to fire the 313CA tube 44. The register circuit cathode voltages are summed again with a suitable negative bias and applied to the grid of a triode shunting down the starter anode supply to tube 44. As long as less than three register tubes are fired the grid of the shunting triode is sufficiently negative so that the tube is cut off. When three or more tubes are fired, however, the shunting triode becomes a low impedance and the starter anode cannot reach a sufficient voltage to fire the tube. Thus tube 44 can fire only when exactly two and neither more nor fewer register tubes are fired. The presence of voltage at the cathode of tube 44 indicates that the digit under consideration is satisfactory.

The circuit for the second check is shown in Fig. 18. The outputs from the three digit-checking circuits, that is the three circuits such as Fig. 17, are summed and applied with a positive bias to the starter anode of a 313CA tube 45, Fig. 18. If all three digit-checking circuits register properly the voltage is sufficient to fire tube 45. When tube 45 fires, it triggers a single-shot multivibrator 46 giving a pulse about 12 milliseconds long. The plates of the multivibrator are connected to the screens of the number completed 2050 gas tube 47 and "recycle" 2050 gas tube 48. During the pulse, the screen of the tube 47 is at ground potential and the screen of the "recycle" tube is at —50 volts. At other times the voltages are interchanged. When the received number is satisfactory the "number completed" signal from the steering circuit is applied to the grids of the two 2050's during the multivibrator pulse and tube 47 fires, delivering current to relay winding 50 in its cathode circuit. When the received number is not satisfactory the multivibrator pulse does not occur and the "recycle" tube 48 fires, delivering current to relay winding 51. The functions of these relays are discussed below under "System relay circuit."

When the circuit as described above was put into service it was found that on a successful call both tubes 47 and 48 would fire. This malfunction was traced to the slow operate times of some of the associated relays. After tube 47 had fired but before signals coming into the receiver were cut off, a number of completed signal following the second repetition of the transmitted number was fed to the two 2050 tubes and tube 48 would then fire. The difficulty was cured by adding a third 2050 tube or anti-recycle tube shunting the "recycle" tube. The "anti-recycle" 2050 tube is fired by the number completed tube and prevents the "recycle" tube from operating its relay after the number completed tube has fired.

Comparator

Figure 19:
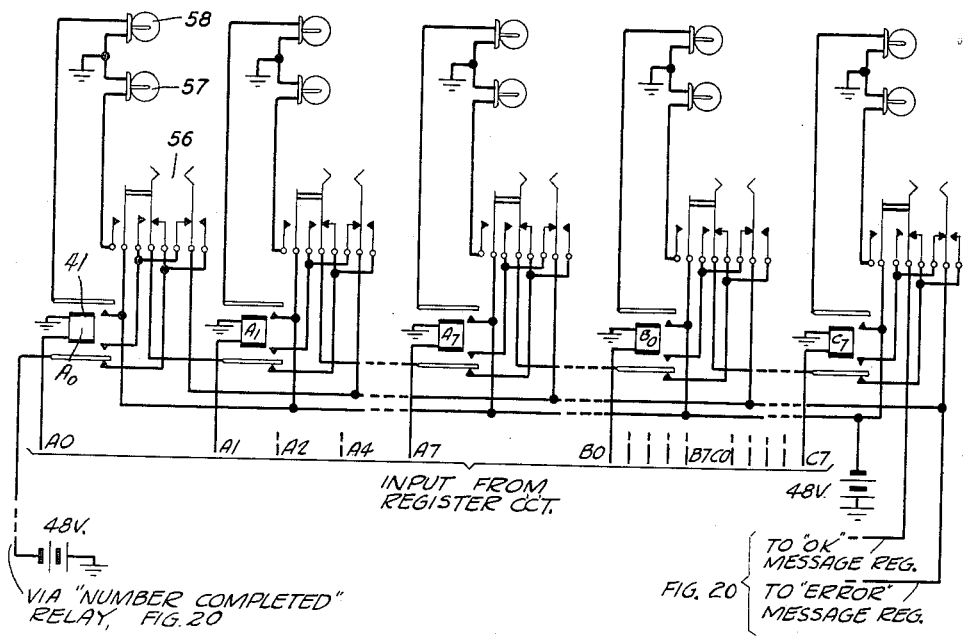
Fig. 19 is a comparator circuit, part of Fig. 9.

Refer now to Fig. 19.

The comparator circuit consists of a relay, such as 41, shown also in the register circuit per Fig. 16, and a key such as 56 for each tube in the register circuit. The keys are preset to an indication of the number being transmitted. Operation of each key lights an associated switchboard lamp such as 57. The relays, such as 41, which are operated by the register tubes light corresponding lamps, such as 58, affording a visual check between transmitted and received numbers. In addition, the relay and key contacts are interconnected to give a path from the input to the "OK" output when corresponding relays and keys are operated, and to the "Error" output when there is any lack of correspondence between operated keys and operated relays. Current flowing through this path operates an "OK" or "Error" message register.

System relay circuit

Refer now to Fig. 20.

In addition to the relays in the comparator circuit the system includes a few relays and message registers performing incidental circuit functions. These relays and registers are connected as shown in Fig. 20. When the switchhook 60 is closed, the line relay 18 also shown in Fig. 9, operates, applying signals to the receiver and operating the "calls" message register 62 to record the placing of a call. If the call is completed successfully, the "number completed" relay 50, also shown in Fig. 18, is operated by one of the 2050 tubes in the check circuit. The number completed relay sends current through the comparator circuit and operates the OK 61 or Error 63 message register, as the case may be. If the lock error key 64 is not operated, pulling up of either the OK or the Error message register applies ground to one end of the winding of the reset relay 68. The other end of this winding goes to battery through a reset key 70 which may be closed momentarily for manual reset or locked for automatic. Operation of the reset relay 68 releases the line relay 18 by opening contact 72 and extinguishes all gas tubes by removing their plate voltage at contact 74. Extinction of the gas tubes releases all other operated relays and the system is then ready to consider another call. If the switchhook 60 is kept operated and the reset key 70 is in the locked position, the system will register calls continuously at a rate determined chiefly by the operate times of the message registers. When the lock error key 64 is operated, the system will run continuously until a wrong number is registered. On the appearance of a wrong number, the lock error relay 76 will operate and prevent the reset relay 68 from operating, thus stopping the system until the lock error key is released.

If the number as received does not consist of three plausible two-out-of-five digits, the recycle relay 51 shown also in Fig. 18, will operate instead of the number completed relay 50. This relay in turn operates the recycle slave relay 78, which extinguishes all gas tubes by removing their plate voltage at contact 80, leaving the system ready to try again to register a satisfactory number on the same call. In addition, the recycle slave relay by closing contact 82 operates a message register 84 which records occurrences of recycles.

*Alternative embodiment of system 1*

When the transmission lines have appreciable phase angles the formulae used in describing the signaling systems of this invention are no longer strictly applicable. System 1 is affected seriously for the following reason whereas $$\int_0^T \sin \omega t \sin \omega t \, dt = 1 \quad (38)$$

$$\int_0^T \sin (\omega t + B) \sin \omega t \, dt = \cos B \quad (39)$$

The angle B of (39) is the phase angle between the signal voltage and the voltage applied to the multiplier. When this angle is 90 degrees the signals which were ones in the absence of phase shift become zeroes. The remedy for this difficulty is suggested by $$\int_0^T \sin (\omega t + B) \cos \omega t \, dt = \sin B \quad (40)$$

If the results of (39) and (40) are squared and added the result is unity for all values of B.

In the presence of appreciable phase shift the transmitter per Fig. 21, omitting voltage source 6, combined with the alternative receiver of Fig. 1A is preferable. Since this does not depend upon the phase of the received signal with respect to the other factor supplied to the multiplier the local factors may be obtained from oscillators at the receiver or other local sources rather than from a timing signal. The individual local signals are shifted 90 degrees and these two quadrature components are applied to separate multipliers. The received signals are applied to other terminals of these multipliers. The outputs of the multipliers are applied to controlled integrators. The outputs of the integrators are squared and added to give the final signal. Since $$\int_0^T \sin (\omega_1 t + B) \sin \omega_2 t \, dt = 0 \quad (41)$$

no matter what the phase angle B is, the zero signals of system 1 will not be affected by phase shift. Therefore the system of Fig. 1A has an output substantially independent of phase and is preferred for use with lines having appreciable phase shift. The addition of the voltages after squaring may be performed, for instance, by means of the summing amplifier disclosed in Patent 2,401,779 K. D. Swartzel June 11, 1946.

What is claimed is:

1. A method of electrical signaling to afford discrimination between received alternating potential signals having differing frequencies, all of said signals having the same amplitude-time characteristic, which comprises: sensing the presence or absence of a voltage at a particular predetermined instant at the end of a predetermined interval after the beginning of the cycles of said signals, said interval depending upon the frequencies of said signals.

2. An electrical signal system comprising a generator having a dissipative series-resonant circuit for generating a signal voltage $$E_m(t) = \epsilon^{-at/\tau} \sin m \pi t/\tau$$

$t > 0$, a circuit connecting said generator to a receiver, said receiver including a network whose impulsive admittance is $$G_n(t) = \epsilon^{-at/\tau} \sin n\pi t/\tau$$

so as to provide a response when said signal is impressed on said network $$V_{mn}(t) = \frac{\epsilon^{-at/\tau}}{\pi(m^2 - n^2)} [m \sin n\pi t/\tau - n \sin m\pi t/\tau]$$

when $m \neq n$, or $$V_{nn}(t) = \frac{\tau}{2n\pi} \epsilon^{-at/\tau} [\sin n\pi t/\tau - n\pi t/\tau \cos n\pi t/\tau]$$

when $m = n$, thus affording discrimination between signals on the basis that at time $t = \tau$, $V_{mn}(\tau) = 0$, while $$V_{nn}(\tau) = \frac{\tau \epsilon^{-a}}{2} (-1)^{n+1}$$

an electronic timer connected to said network for establishing the interval $\tau$, and a voltage responsive element for determining the presence of V at the termination of said interval $\tau$.

3. An electrical signaling circuit comprising a transmitter including a generator for generating a plurality of damped sine waves of different frequencies, a receiver comprising a plurality of dissipative series resonant circuits each having different impulsive admittances corresponding individually to said waves, a channel interconnecting said transmitter and receiver for impressing said waves on said receiver, and means including a time controlled detector in said receiver for testing the magnitude of the respective voltages across corresponding terminals of said resonant circuits at a particular instant so to provide discrimination between said damped waves, said instant at the end of a predetermined interval after the beginning of the cycles of said waves, said interval depending upon the frequencies of said waves.

4. A receiver for discriminating between a plurality of damped sine waves of different frequencies, said receiver comprising a plurality of dissipative series resonant circuits, said circuits having selected impulsive admittances corresponding individually to the frequencies and damping constants of said damped sine waves and a timing circuit connected to a voltage sampling circuit for determining the magnitude of the voltages in each of said resonant circuits at a particular instant after the start of reception of said waves dependent upon the frequencies of said waves.

5. In an electrical signaling system, a transmitter comprising a two-position switch operable during a cycle of operation to a first position, at a first time, to apply a step function of voltage to a dissipative series resonant circuit in said transmitter for an interval $m$ milliseconds, so as to transmit a damped sine wave voltage having a duration of approximately $m$ milliseconds, said switch operable, at a second time during said cycle, to a second position, in which second position a critical damping resistance is introduced into said circuit, so as to damp out oscillations before a repetition of said cycle, a circuit connecting said transmitter to a receiver, said receiver including a tuned circuit having an impulsive response corresponding to said damped wave, a voltage measuring circuit for measuring the output voltage of said tuned circuits at a selected time interval of short duration, and a time control circuit for controlling the time of said measurement, the time of said measurement dependent on the frequency of said wave after its reception by said tuned circuit.

6. An electrical signal receiver comprising a plurality of individual tuned circuits, each of said circuits having a different indicial admittance to impulses impressible on said circuits, a signal impulse selecting device in said receiver, said device comprising a voltage amplitude sampling means, said sampling means responsive to a time control in said receiver, said sampling means and said time control arranged to test the amplitude of the voltage waves in said tuned circuits at a critical interval of short duration, when said amplitude is substantially zero in certain of said tuned circuits, and when said amplitude is substantially a maximum in the other of said circuits.

7. An electrical signal receiver comprising a plurality of individual tuned dissipative circuits, each of said circuits having a different impulsive admittance to voltage impulses impressible on said circuits, an electrical signal voltage wave generator for simultaneously impressing on said tuned circuits a plurality of signal voltages in the form of damped sine waves, each of said waves differing in frequency from the other, each of said waves having a frequency matching the impulsive admittance of a corresponding particular one of said tuned circuits, individual signal voltage detectors connected to said tuned circuits, and a time control circuit connected to said detectors for sampling the voltages impressed on said detectors by said tuned circuits during a short critical interval, when the voltage in each of said tuned circuits is substantially zero or substantially a maximum dependent on the matching or mismatching of the frequencies of said damped waves and said impulsive admittances.

8. In an electrical signal receiving system, the method of selectively receiving signals which comprises as steps: (1) applying a voltage wave which includes a first plurality of damped sinusoidal voltage pulses of differing frequencies to a larger plurality of receiving circuit elements having differing impulsive admittances, said receiving elements including a first plurality of elements having impulsive admittances corresponding to the frequencies of said first plurality of pulses; (2) testing the respective amplitudes of the voltage waves in all of said receiving circuit elements simultaneously, during a short interval beginning at a particular instant, when the amplitude of the voltage wave in each of said first plurality of receiving elements is substantially a maximum and the amplitude of the voltage wave in each of the other of said receiving elements is substantially zero.

9. In an electrical signal selective receiving circuit, a plurality of tuned circuits, a detector for testing the amplitude of the voltage wave in said circuits, a look pulse circuit for controlling the instant of testing said amplitude, and a register circuit for registering the presence of voltage waves of a required amplitude at said instant.

10. An electrical signal selecting receiving system in according with the last preceding claim including a start circuit for establishing the time of arrival of a received signal and of starting a receiving cycle.

11. An electrical signal receiving system, a signal selecting circuit therein, a voltage amplitude detector connected to said circuit for detecting signals received by said circuit, a start circuit for determining the start of a receiving cycle of said system and a timing circuit for fixing the instant of detection of said signals at a predetermined interval after the start of said cycle.

12. A system in accordance with the last preceding claim, said system inclding a register circuit, said register circuit having individual groups of registering elements, a steering circuit connected to said detector and said register circuit, and means in said register circuit, responsive to said steering circuit, for registering a succession of permutation code signal combinations, each of said combinations completely identifying an individual symbol of a succession of symbols impressed on said groups of elements.

13. In an electrical signaling system a selective receiving circuit based on the discrimination afforded by orthogonal functions $$\int_0^T \Phi_i(t)\cdot\Phi_j(t)dt=0, \ i\neq j$$

$$\int_0^T \Phi_i(t)\cdot\Phi_j(t)dt=1, \ i=j$$

said system comprising a plurality of voltage multipliers the outputs of which are connected to a plurality of voltage integrators.

14. A high speed electrical signaling system including a voltage transmitter for transmitting a signal in the form of a sinusoidal voltage of a particular frequency, a selective receiver connected to said transmitter, said receiver comprising a test circuit including a voltage multiplier, means for applying said signal voltage and a test voltage to said multiplier to produce a voltage substantially equal to the product of said voltages, a voltage integrator for integrating said product and a time control circuit for establishing a predetermined interval for said integration.

15. A high speed selective electrical signal receiver for application on transmission lines having appreciable phase distortion, said receiver comprising a voltage generator arranged to generate a first voltage, $\sin n\omega t$, and a second voltage $\cos n\omega t$, a first multiplier for multiplying a distorted received signal voltage $\sin(n\omega t+B)$ and said first voltage, a second multiplier for multiplying said received voltage and said second voltage, a first and a second integrator for individually integrating the products of said multiplication over a predetermined measured interval, a timing circuit for establishing said interval, individual voltage squaring circuits for individually squaring the voltages afforded by said integrators and a summing circuit for adding together the products of said squaring circuits.

16. A high speed selective electrical signal receiver for application on transmission lines having appreciable phase distortion so that a signal voltage, $\sin\omega t$, becomes $\sin(\omega t+B)$ as a result of said distortion, said receiver having voltage generators, voltage multipliers, voltage integrators, a timer, voltage squarers and voltage summers, to implement the relationships:

$$\int_0^T \sin(\omega t+B)\sin\omega t\, dt=\cos B$$

$$\int_0^T \sin(\omega t+B)\cos\omega t\, dt=\sin B$$

$$\sin^2 B+\cos^2 B=1$$

17. A high speed selective electrical signal receiver for application on transmission lines having appreciable distortion, said lines distorting an applied sinusoidal voltage, $\sin n\omega t$, and delivering to said receiver a signal voltage having phase distortion, $\sin(n\omega t+B)$, a voltage generator in said receiver for generating two test voltages, $\sin n\omega t$ and $\cos n\omega t$, a first voltage multiplier in said receiver for multiplying said distorted voltage and one of said test voltages a second voltage multiplier in said receiver for multiplying said distorted voltage and the other of said test voltages, voltage integrators in said receiver for individually integrating the products of said multiplication over a fixed interval, a timer in said receiver for establishing said interval, a pair of voltage squarers in said receiver for squaring each of said integrated voltages individually and a voltage summer in said receiver for adding together the products of said squarers.

18. A high speed electrical selective signal receiving system including a signal receiving circuit connected in parallel to a plurality of paired mathematical operator branches, an individual voltage generator connected in parallel to the inputs of the branches of each of said pairs, each of said generators arranged to impress a sine function of voltage of a particular frequency on one branch of said pair, and a cosine function of voltage of the same frequency on the other branch of said pair, said frequencies differing for each pair of branches, a voltage multiplier, a voltage integrator and a voltage squarer all individual to each of said branches and connected in the named sequence along each of said branches between the input and output thereof, and a voltage summer individual to each of said pairs of branches connected to the combined output of each of said pair, said system responding to the impressing of a sine function of voltage of a frequency corresponding to that of a particular pair of branches by delivering a signal from the summer connected to said pair only.

19. A system in accordance with claim 31, including means for impressing on more than one of said paired branches, simultaneously, incoming signal voltages having more than one frequency, each frequency corresponding to that of a different particular pair of said branches, so as to produce an individual signal in more than one of said summers.

20. In an alternating-current signal selecting system, a generator for generating an alternating potential signal of a predetermined frequency and a predetermined amplitude-time characteristic, a signal receiver, a signal transmission channel interconnecting said generator and said receiver, means in said receiver for multiplying said signal by an alternating potential of the same frequency and characteristic as said predetermined frequency and characteristic and integrating the product over a short interval and a potential responsive device for sensing the integrated product for an instant at the end of the interval of integration.

21. In an alternating-current signal selecting system, a plurality of generators for generating a plurality of alternating potential signals each of a differing frequency, all signals having the same amplitude-time characteristic, a signal receiver, a signal transmission channel interconnecting said generators and said receiver, means in said system for impressing code combinations of said signals through said channel on said receiver, an individual branch in said receiver for receiving each one of said signals of differing frequencies, each of said branches comprising means for multiplying the alternating potential of its respective individual receivable signal by an alternating potential corresponding to that of its respective receivable signal and having the same amplitude-time characteristic and integrating the product over a short interval, and an individual potential responsive device connected to each said branch for sensing the integrated product for an instant at the end of the interval of integration.

22. In an alternating-current transmission system, an alternating-current signal receiver comprising a circuit having a voltage multiplier which multiplies a received signal potential of a particular frequency and a particular amplitude-time characteristic by a potential of the same frequency and the same amplitude-time characteristic and an integrator which integrates the product over an interval, which interval is a function of the frequency of the received signal, and a potential sensing device which senses the potential of the integrated product at the end of the period of integration.

23. In an alternating-current signal transmission system the method of operation which comprises: (1) transmitting an alternating potential of a predetermined frequency and of a predetermined amplitude-time characteristic; (2) multiplying said potential by a potential of said predetermined frequency and said predetermined characteristic; (3) integrating the product of said multiplication over a short interval; (4) sensing the integrated product at the end of said interval.

CLARENCE A. LOVELL.

References Cited in the file of this patent

UNITED STATES PATENTS

| Number | Name | Date |
|---|---|---|
| 1,661,962 | Robinson | Mar. 6, 1928 |
| 1,711,137 | Brumder | Apr. 30, 1929 |
| 2,176,742 | La Pierre | Oct. 17, 1939 |
| 2,205,330 | Allen | June 18, 1940 |
| 2,206,538 | Rhodes | July 2, 1940 |
| 2,251,973 | Beale et al. | Aug. 12, 1941 |
| 2,275,930 | Torcheux | Mar. 10, 1942 |
| 2,319,339 | Muller | May 18, 1943 |
| 2,324,797 | Norton | July 20, 1943 |
| 2,325,829 | Boswau | Aug. 3, 1943 |
| 2,332,912 | Hecht et al. | Oct. 26, 1943 |
| 2,363,671 | Hubbard | Nov. 28, 1944 |
| 2,369,662 | Deloraine | Feb. 20, 1945 |
| 2,395,467 | Deloraine | Feb. 26, 1946 |
| 2,400,574 | Rea et al. | May 21, 1946 |
| 2,413,440 | Farrington | Dec. 31, 1946 |
| 2,424,585 | Simon | July 29, 1947 |
| 2,434,898 | Bascom | Jan. 27, 1948 |
| 2,450,352 | Piety | Sept. 28, 1948 |

FOREIGN PATENTS

| Number | Country | Date |
|---|---|---|
| 375,349 | Great Britain | July 20, 1932 |

OTHER REFERENCES

Fundamental Mathematics by Duncan Harkin, p. 113, pub. 1941 by Prentice-Hall, in New York.